US008557021B2

(12) United States Patent
Nishimura

(10) Patent No.: US 8,557,021 B2
(45) Date of Patent: Oct. 15, 2013

(54) METHOD OF REGULATING NICKEL CONCENTRATION IN LEAD-FREE SOLDER CONTAINING NICKEL

(75) Inventor: Tetsuro Nishimura, Osaka (JP)

(73) Assignee: Nihon Superior Sha Co., Ltd. (JP)

( * ) Notice: Subject to any disclaimer, the term of this patent is extended or adjusted under 35 U.S.C. 154(b) by 0 days.

(21) Appl. No.: 12/867,118

(22) PCT Filed: Feb. 22, 2008

(86) PCT No.: PCT/JP2008/053041
§ 371 (c)(1),
(2), (4) Date: Aug. 11, 2010

(87) PCT Pub. No.: WO2009/104271
PCT Pub. Date: Aug. 27, 2009

(65) Prior Publication Data
US 2010/0307292 A1   Dec. 9, 2010

(51) Int. Cl.
*C22C 13/00* (2006.01)
*B23K 31/02* (2006.01)
(52) U.S. Cl.
USPC ........... 75/690; 228/56.1; 228/56.2; 228/102; 228/103; 228/8; 420/590
(58) Field of Classification Search
USPC ............. 420/590; 228/102, 103, 8, 56.1, 56.2
See application file for complete search history.

(56) References Cited

U.S. PATENT DOCUMENTS

| 5,390,845 A * | 2/1995 | McDonald | 228/217 |
| 7,628,308 B2 * | 12/2009 | Ojima et al. | 228/102 |

| 2003/0021718 A1 | 1/2003 | Munekata et al. | |
| 2004/0062679 A1 | 4/2004 | Munekata et al. | |
| 2005/0005736 A1* | 1/2005 | Ueshima | 75/690 |
| 2006/0011709 A1 | 1/2006 | Ojima et al. | |

FOREIGN PATENT DOCUMENTS

| JP | 11-333589 | 12/1999 |
| JP | 2003-266193 | 9/2003 |
| JP | 3622788 | 2/2005 |
| JP | 2007-075836 | 3/2007 |

OTHER PUBLICATIONS

PCT, International Preliminary Report on Patentability, International Application No. PCT/JP2008/053041, 5 pages (Oct. 14, 2010).
PCT, International Search Report; 4 pages (mailed May 20, 2008; published Aug. 27, 2009).
PCT, Written Opinion of the International Searching Authority; 3 pages (May 8, 2008).

* cited by examiner

*Primary Examiner* — George Wyszomierski
*Assistant Examiner* — Tima M McGuthry Banks
(74) *Attorney, Agent, or Firm* — Thompson Hine L.L.P.

(57) ABSTRACT

A method by which the amount of nickel contained in an alloy having a composition represented by Sn—X—Ni can be regulated. The method of nickel concentration regulation comprises adding phosphorus to Sn—X—Ni in a molten state (wherein X is one or more elements selected from the group consisting of Ag, Zn, Cu, Bi, Au, Ti, Ge, Ga, Si, and Ce), holding the mixture at 250-400° C., and removing the resultant dross floating on the surface of the liquid phase and containing a P—Ni compound and a P—Sn—Ni compound. An example of X is copper, and the content thereof may be 0.3-5 wt %. The phosphorus may be added in the state of a Sn—P alloy. The upper limit of the amount of the phosphorus to be added may be about half the nickel amount in terms of atomic amount.

5 Claims, 1 Drawing Sheet

METHOD OF REGULATING NICKEL CONCENTRATION IN LEAD-FREE SOLDER CONTAINING NICKEL

CROSS REFERENCE TO RELATED APPLICATION

The present application is a U.S. National Stage application of PCT International Application No. PCT/JP2008/053041 filed Feb. 22, 2008.

TECHNICAL FIELD

The present invention relates to a method of regulating nickel concentration (amount), for example, in a Sn—Cu—Ni lead-free solder alloy and effectively functions in the recycling of Sn.

BACKGROUND ART

Solder alloys not containing Pb are actively being developed. Currently, a Sn—Ag based solder alloy and a Sn—Cu—Ni based solder alloy are the mainstays. Sn—Cu—Ni based solder is advantageously low in material costs in comparison with Sn—Ag based solder. A Ni based solder alloy having a composition disclosed in a patent granted to the applicant of this application is available as a Sn—Cu—Ni based solder alloy and has a Sn-0.7 wt % Cu with 0.05 wt % Ni added thereto.

Metal resources have been more and more difficult to obtain in recent years. The recycling of metals is thus demanded in view of a sharp rise in material costs and earth environment. The above-described Sn—Cu—Ni based solder alloy has a Sn concentration of about 99 wt %, and it is important to recycle Sn.

Prior Art: Japanese Patent No. 3152945

DISCLOSURE OF INVENTION

Problems to be Solved by the Invention

In the above-described related art technique, a Ni concentration is 0.04-0.1 wt %, and a characteristic peak is found in the vicinity of 0.05 wt %. A margin of a Ni concentration that permits an appropriate characteristic is relatively narrow, and a Ni additive amount is preferably strictly controlled. Since an appropriate additive amount of Ni is extremely small in comparison with Sn as a base alloy, it is very difficult to control the additive amount. For example, a Ni concentration of 0.05 wt %, which is originally intended as an additive amount, might be doubled, resulting in a Ni concentration of 0.1 wt %. To regulate the additive amount back to an intended value of concentration of 0.05 wt %, twice the original amount of Sn—Cu is needed. This means that the amount of Sn—Cu 200 times the Ni additive amount is needed. As a result, an amount of Sn—Cu—Ni alloy twice the originally planned amount happens to be manufactured. Such results not only present inconveniences in inventory management but also unnecessarily consumes melting heat energy and time in the manufacture of the alloy. This also presents to the manufacturer an actual problem in inventory adjustment.

It is an object of the present invention to disclose a method of regulating the above-described Ni additive amount and also to disclose a new method of recycling Sn.

Means for Solving the Problems

The present invention focuses on P as an element to be used to achieve the above object. It is known that if P is added to a Sn—Cu—Ni compound in a molten state, Ni reacts with P, becoming a P—Ni compound or a P—Sn—Ni compound. If P is added to molten Sn—Cu—Ni solder containing Ni in excess of a predetermined value, these compounds float on the surface of a liquid phase and form dross because of a specific gravity thereof lower than that of the molten metals. If the dross thus formed is separated from the molten metals, excessive Ni can be recycled. As a result, the Ni concentration of the molten solder is diluted. The present invention is based on the positive use of this phenomenon.

The present invention includes, as means for solving the above problem, adding phosphorus to Sn—X—Ni in a molten state (X being one or more elements selected from the group consisting of Ag, Zn, Cu, Bi, Au, Ti, Ge, Ga, Si, and Ce), holding the mixture of phosphorus and Sn—X—Ni at 250-400° C., and removing resulting dross floating on the surface of the liquid phase and containing a P—Ni compound and a P—Sn—Ni compound. The Ni concentration is thus regulated. This means is based on the phenomenon that that P reacts with Ni and Sn, forming the P—Ni compound and the P—Sn—Ni compound and that these compounds are lower in specific gravity than the molten metals forming the liquid phase. These compounds are thus positively floated on the surface of the liquid phase. The Ni concentration is positively controlled by regulating the additive amount of P according to a calculated value. Any element may be selected as the element X from the group, but it is important that the element X be useful as a component of a lead-free solder alloy. The temperature at which the mixture is held is 250-400° C. such that the element X, if any element, exceeds the liquidus temperature of the molten alloy. The upper limit is set to be 400° C. because too high a temperature is not appropriate in view of a removal operation of the dross.

The element X is specified as Cu in claim 1. The Sn—Cu—Ni solder alloy has a structure of a patented invention granted to the applicant of this application, and the applicant has known that the Sn—Cu—Ni solder alloy has a very useful effect in an embodiment. The lower limit of the concentration of Cu is set to be 0.3 wt % in order to cause Cu to exhibit a function required of Cu in an alloy having a relatively low melting point. More specifically, the lower limit of the concentration of Cu is set that copper leaching of a lead wire is controlled and that strength of a joint as a solder alloy is sufficient. The upper limit of the Cu concentration is set to be 5 wt % because this level of concentration is needed when a high melting point solder is manufactured.

The knowledge of the inventors shows that the Ni concentration within a range of 0.04-0.07 wt % in Sn-0.7 wt % Cu dramatically increases fluidity of molten solder. The concentration of Ni is finally regulated to within this range. Removing Ni as much as possible from the Ni containing alloy falls within the scope of the present invention. The present invention is based on the premise that an initial concentration of Ni in the solder alloy prior to regulation is inconveniently high. In view of the object of the present invention, the initial concentration of Ni is not necessarily determined.

P in a state prepared beforehand in a Sn—P alloy is added. This method outperforms in handling easiness a method of adding P alone, because the additive amount of P is more easily controlled.

As described above, the additive amount of P is determined depending on how much concentration Ni is regulated to. The upper limit of the P concentration is set to be about half the Ni amount in terms of atomic amount. The P compounds of the present invention are expected to be $NiP_2$, $NiP_3$, Ni SnP, $Ni_{10}Sn_5P_3$ or a compound similar thereto. In weight calculation, P is combined with all the contained Ni at about half the contained amount of Ni in terms of atomic. In order to remove Ni almost completely from the alloy composition and to obtain a Sn—X alloy, the relationship of the two elements is the compounding ratio described above. Even if the additive amount of P is slightly larger than the amount specified herein, P itself becomes part of the dross and then naturally removed. Therefore, half the amount described in the context of the present invention does not mean strictly 50%. The P amount intended herein is preferably defined as an amount required to be combined with all Ni contained in the initial composition.

Advantages

In accordance with the present invention including the means thus described, the Ni concentration was diluted by adding a predetermined amount of P to the molten Sn—Cu—Ni solder, and by simply removing the dross containing the P—Ni and/or P—Cn—Ni compound floating on the surface of the molten solder bath. This method eliminates the need to add a Sn—Cu alloy or S to dilute the Ni concentration of the Sn—Cu—Ni alloy containing excess Ni. Inventory management is thus facilitated but additional heat energy for melting is not needed. Ni can be completely removed from the Sn—Cu—Ni alloy depending on the additive amount of P, and a recycled Sn—Cu alloy can be easily obtained.

BEST MODE FOR CARRYING OUT THE INVENTION

Preferred embodiments of the present invention are described below. In accordance with the present embodiment, the Ni concentration is lowered from the initial value thereof in the Sn—Cu—Ni alloy. The Sn—Cu—Ni alloy the compounding ratio of which is beforehand confirmed is melted in a bath and then a Sn—P base alloy is introduced into the molten Sn—Cu—Ni alloy. It is technically difficult to add P alone, and it is preferred that P is melted in Sn having the largest amount among the molten elements to form a base alloy, and the base alloy is then added. An aging operation of a predetermined time in this state causes P to be more easily combined with Ni. The P—Ni compound or the P—Sn—Ni compound is thus produced. Since these compounds are lower density than Sn, which forms about 99 wt % of the liquid phase, the compounds are floating on the surface of the liquid phase and emerge as part of the dross on the surface of the liquid phase. If the dross is removed in this state using an appropriate means, only the Ni component combined with P is reduced from the liquid phase. As a result, the liquid phase reaches a composition with Ni diluted from the initial concentration thereof.

Embodiment 1

The Sn—Cu—Ni alloy (Sn-0.7Cu-0.05Ni) (hereinafter all the accompanying values being represented in wt % and Sn being the remaining content) was produced, and component analysis is performed on the alloy immediately subsequent to the production. The alloy was then melted in a crucible, then held for 1 hour at a temperature of 300° C., and a dross deposit on the surface was removed within about 5 minutes. The component analysis was then performed on the alloy in the crucible. Table 1 lists analysis values immediately subsequent to the alloy production, and analysis values subsequent to the removal of the dross.

TABLE 1

| | Analysis values (weight %) | | |
|---|---|---|---|
| Alloy state | Sn | Cu | Ni |
| Sn—0.7Cu—0.05Ni immediately subsequent to production | Remaining portion | 0.696 | 0.056 |
| Sn—0.7Cu—0.05Ni after being held in molten state for 1 hour | Remaining portion | 0.695 | 0.056 |

The results of table 1 show that the Ni concentration remains unchanged in the Sn—Cu—Ni alloy even after the alloy is held in a molten state for 1 hour.

Next, P base alloy (Sn-5P) was then added to the Sn—Cu—Ni solder alloy as heavy as 1000 g and molten at 300° C. until the total P concentration of 50 ppm with respect to the total amount of the solder alloy was reached in calculation value. The alloy was then held for 1 hour, the dross was removed within 5 minutes, and component analysis was then performed on the resulting alloy. Similarly, P base alloy (Sn-5P) was then added to the Sn—Cu—Ni solder alloy as heavy as 1000 g and molten at 300° C. until the total P concentrations of 100 ppm, 500 ppm, and 1000 ppm with respect to the total amount of the solder alloy were reached in calculation values. As a result, the Ni concentrations of four types of samples were checked together with the P concentrations. Table 2 lists the results.

TABLE 2

| | Analysis values (weight %) | | |
|---|---|---|---|
| Alloy state | SnCu | Ni | P |
| Sn—0.7Cu—0.05Ni + 50 ppm P after being held in molten state for 1 hour | Remaining component | 0.055 | 0.003 |
| Sn—0.7Cu—0.05Ni + 100 ppm P after being held in molten state for 1 hour | Remaining component | 0.056 | 0.005 |
| Sn—0.7Cu—0.05Ni + 500 ppm P after being held in molten state for 1 hour | Remaining component | 0.046 | 0.019 |
| Sn—0.7Cu—0.05Ni + 1000 ppm P after being held in molten state for 1 hour | Remaining component | 0.026 | 0.034 |

The results of Table 2 show that the addition of P to 1000 ppm reduced the Ni concentration to half the initial Ni concentration. The sample with P added to 100 ppm shows substantially the same result as the 50 ppm sample. The addition of P to 500 ppm and 1000 ppm reduced further the Ni concentration. The base P alloy used in the sample with P added to 1000 ppm was 18 g.

Embodiment 2

The Sn-0.7Cu-0.05Ni solder alloy was melted in a crucible, and the P base alloy (Sn-5P) was added to a calculation value of 500 ppm P concentration with respect to the total solder alloy amount. The waving operation was performed with a temperature of 250° C. maintained. Samples were then picked up every predetermined time unit, and quantitative analysis of Ni and P was performed using X-ray fluorescence and ICP. TABLE 3 lists the results. In addition, P was added to a Sn—Cu alloy containing no Ni, and the component analysis of the P concentration was performed after the waving operation. TABLE 4 lists the results.

TABLE 3

| SnCuNi | Ni(%) | P(%) |
| --- | --- | --- |
| Added amount | 0.05 | 0.05 |
| Initial value | 0.04 | 0.03 |
| After waving operation of 1 hour | 0.03 | 0.04 |
| After waving operation of 2 hours | 0.02 | 0.01 |
| After waving operation of 3 hours | 0.02 | 0.01 |

TABLE 4

| SnCu | P(%) |
| --- | --- |
| Added amount | 0.05 |
| Initial value | 0.04 |
| After waving operation of 1 hour | 0.02 |
| After waving operation of 2 hours | 0.01 |
| After waving operation of 3 hours | 0.01 |

According to the results of Table 3, the addition of P to the Sn—Cu—Ni solder alloy and the waving operation performed on the resulting molten alloy reduced the Ni concentration. According to the results of Table 4, the addition of P to the Sn—Cu alloy containing no Ni and the waving operation on the resulting alloy reduced the P concentration in a substantially similar trend to Table 3. It can be explained that not only P itself forming the dross is reduced but also a compound of P and Ni also forming the dross is reduced.

Embodiment 3

In order to verify that the addition of P to the Sn—Cu—Ni solder alloy combines Ni with P, forming the P—Ni compound or the P—Sn—Ni compound, a Sn-0.7Cu-0.05Ni-0.06P alloy was melted and then solidified in a crucible, the resulting solid was cut into halves, and the cross-section of the solid substance was subjected to elemental mapping through SEMEDX. FIGS. 1 and 2 illustrate the results. FIG. 1 illustrates the presence of the P—Ni compound seen on the top layer of the solid substance, and FIG. 2 illustrates the presence of the P—Ni compound seen in the approximate center of the solid substance.

The photographs of FIGS. 1 and 2 show that P is combined with Ni forming the compounds regardless of whether it is in the top layer or the in the approximate center of the solid substance. The comparison of the SEM photographs on the leftmost end show that the density of the P—Ni compound or the P—Sn—Ni compound is higher in the top layer illustrated in FIG. 1. This phenomenon shows that the P—Ni compound and the P—Sn—Ni compound small in specific gravity congregates in the surface of the molten metals with time, and that the removal of the dross from the surface of the liquid phase removes the P—Ni compound and the P—Sn—Ni compound at the same time. As discussed with reference to embodiment 2, the P—Ni compound and the P—Sn—Ni compound are reliably moved to the surface of the liquid phase by agitating the molten metals. The dross is preferably removed while the molten solder alloy is being agitated.

The Sn—Cu—Ni alloy is disclosed in the above-described embodiments. The element X in the present invention, i.e., Cu, has no substantial function, and does not affect the reduction of Ni in weight ratio. Even if X is a different element other than Cu, the conclusion of the embodiments and examples remains unchanged.

Figure 1:
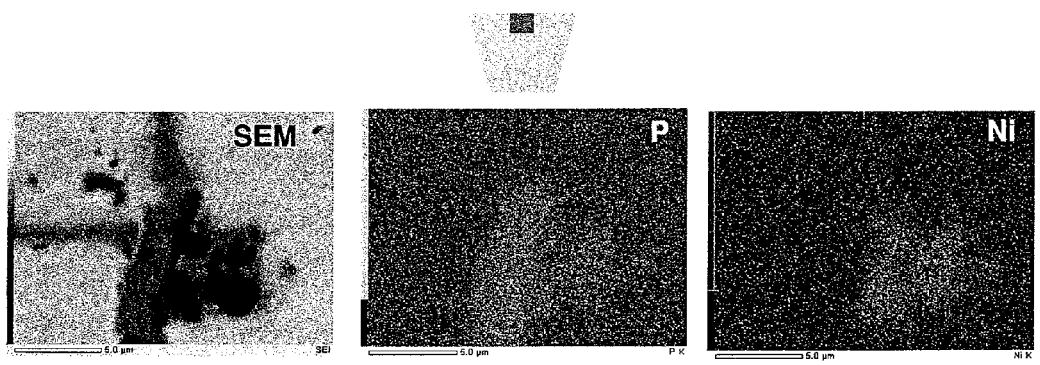
FIG. 1 shows photographs of element mapping of P and Ni at a top layer of a Sn—Cu—Ni—P alloy.
Figure 2:
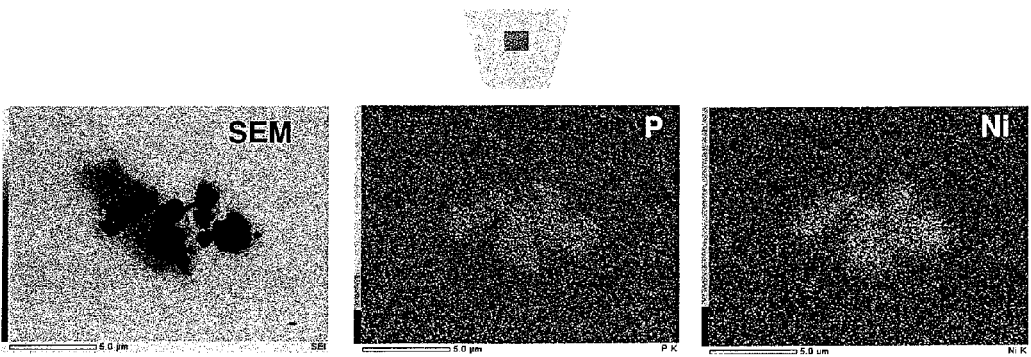
FIG. 2 shows photographs of element mapping of P and Ni in an approximate center of the Sn—Cu—Ni—P alloy.

The invention claimed is:

1. A method of regulating Ni concentration, the method comprising:
adding an amount of P to Sn—Cu—Ni comprising an excess of Ni over a desired Ni concentration while in a molten state,
holding the mixture of P and Sn—Cu—Ni at 250-400° C. resulting in a dross floating on the surface of a liquid phase, and
removing the resulting dross floating on the surface of the liquid phase,
wherein the dross contains at least one of a P—Ni compound and a P—Sn—Ni compound thereby diluting the Ni concentration remaining in the molten Sn—Cu—Ni to the desired concentration; wherein the desired concentration of Ni is within a range of 0.04-0.1 wt %.

2. The method of regulating Ni concentration according to claim 1, wherein P is added in the form of a Sn—P alloy.

3. The method of regulating Ni concentration according to claim 1, wherein an upper limit of an amount of P to be added is about half the Ni amount in terms of atomic amount.

4. The method of regulating Ni concentration according to claim 1, wherein the regulated Sn—Cu—Ni composition has a Ni concentration of 0.04-0.07 wt %.

5. The method of regulating Ni concentration according to claim 4, wherein the concentration of Cu is 0.7 wt %.

* * * * *